(12) United States Patent
Majidi et al.

(10) Patent No.: US 8,579,842 B2
(45) Date of Patent: Nov. 12, 2013

(54) ENHANCED FRICTION OF MICROPATTERNED SURFACES IMMERSED IN MAGNETORHEOLOGICAL FLUID

(75) Inventors: Carmel S. Majidi, Pittsburgh, PA (US); Robert J. Wood, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 402 days.

(21) Appl. No.: 12/945,029

(22) Filed: Nov. 12, 2010

(65) Prior Publication Data
US 2012/0123190 A1    May 17, 2012

(51) Int. Cl.
*A61F 5/00*          (2006.01)
(52) U.S. Cl.
USPC ......... 602/5; 602/16; 602/23; 602/27; 600/15

(58) Field of Classification Search
USPC ............ 602/16, 26, 25, 27; 188/267.1, 267.2; 252/62.4, 62.5, 62.6
See application file for complete search history.

(56) References Cited

U.S. PATENT DOCUMENTS

| 5,549,837 | A | * | 8/1996 | Ginder et al. | ............... | 252/62.52 |
| 5,609,353 | A | * | 3/1997 | Watson | ....................... | 280/5.516 |

* cited by examiner

*Primary Examiner* — Kim M Lewis
(74) *Attorney, Agent, or Firm* — Nixon Peabody LLP; David S. Resnick; David F. Crosby

(57) ABSTRACT

A method and system are provided for that allow for varying stiffness of a system by applying a low magnetic field to magnetorheological (MR) fluid in the system. The method and system include exposed patterns on facing surfaces of sliding structures. The facing patterns contain MR fluid. When a low to moderate magnetic field is applied to the MR fluid, the patterns are magnetically attracted to MR domains confined to the opposing surface, thus requiring additional force to slide the structures past each other.

22 Claims, 4 Drawing Sheets

US 8,579,842 B2

ENHANCED FRICTION OF MICROPATTERNED SURFACES IMMERSED IN MAGNETORHEOLOGICAL FLUID

GOVERNMENT SUPPORT

This invention was made with government support under DMR-0820484, awarded by the National Science Foundation. The government has certain rights in this invention.

TECHNICAL FIELD

The present invention relates generally to generation of magnetic fields. More particularly, it relates to improvements in allowing for varying stiffness of a system by applying a low magnetic field to magnetorheological (MR) fluid in a prescribed system.

BACKGROUND

Magnetorheological (MR) fluid is composed of magnetizable microparticles (e.g., 1-10 microns in diameter) that are suspended in a carrier oil. Under a strong magnetic field of 0.1 to 1 Tesla, the microparticles become magnetized and spontaneously bond together to form semi-rigid chains. This network of bonded microparticles causes the fluid to harden into a solid. Solidification is reversible and the MR fluid instantly returns to the liquid state once the field is removed.

This property of dramatic but reversible field-controlled phase change makes MR fluid attractive for applications that require tunable rigidity and viscosity. Currently, MR-fluid is used in clutches, brakes, and suspension for high-end automotive systems. There is also interest in using MR-fluid for tunable damping in active orthotics and prosthetics. In both applications, MR-fluid functions as a lubricant that controls the friction between sliding surfaces. In the absence of a magnetic field, the lubricant has low viscosity and the surfaces slide freely past each other. When a strong magnetic field is applied, the fluid hardens and prevents sliding by bonding the surfaces together like a plastic glue.

Actively controlling material impedance is enabling for emerging fields such as soft robots for exploration and natural disaster relief and soft active orthotics for motor therapy and gait correction. Recent efforts have focused on jamming techniques such as pneumatic-controlled packing of granular particles in an elastomer-sealed chamber and the hydration of a soft nanowhisker-gel composite, which solidifies when dry by forming rigid, cellulose networks. Compliance control has also been accomplished with mechanisms that utilize, gears, pulleys, motors, and springs. Designs have been inspired by a variety of systems in nature, including catch connective tissue in sea cucumbers and muscular co-contraction in human motor tasks.

Methods based on fluidic jamming and springs require the added complexity of external pumps, tanks, and motors and, hence, may not be suitable in low power or millimeter scale systems. One promising alternative is to use magnetorheological (MR) fluid, which solidifies in the presence of a strong magnetic field. However, current magnetorheological-based methods for active damping and stiffness control require a relatively large magnetic field to solidify the fluid and resist interfacial sliding of discs and clutches. For example, a 0.5-1 Tesla (T) magnetic field may be required in the aforementioned application. While appropriate for large-scale automotive and industrial applications, such techniques are prohibitive in small and low power systems where magnetic field generation is limited.

Increasingly used in automotives and aerospace, MR-fluid has also been utilized for stiffness and damping control in other applications such as adaptive orthotic devices. However, due to solidification requirements commanding relatively large magnetic fields (e.g., 0.5-1 Tesla), practical application has been prohibitive for small or low power devices.

Thus, exploiting properties of MR-fluid for soft, miniature, and low-powered systems requires novel insights and mechanisms for reversible stiffness control at low or moderate magnetic fields (1-10 mT, 1 mT=$10^{-3}$ Tesla). This is because strong magnetic fields of greater than 100 mT require either permanent magnets (which cannot be switched off) or large electromagnets that are rigid and consume great amounts of both space and electrical power.

Accordingly, a need exists for methods and systems having adaptive functionality aided by novel, non-solidification modes of MR compliance control.

SUMMARY

It is, therefore, an object of the present invention to overcome the deficiencies of the prior art to include a method and system for demonstrating enhanced sliding resistance at low magnetic field (e.g., 10-35 mT) with surface micropatterns that confine the magnetorheological fluid to spatially aligned domains. Interfacial sliding is controlled by the magnetic attraction of the confined domains rather than shear failure of solidified fluid. Micropatterned surfaces are supported by a pair of overlapping ribbons, which, along with the surrounding fluid, are enclosed in a soft elastomer. The embedded elastomer represents an electromagnetic alternative to current methods of active stiffness control that are based on principles of gel hydration, particle jamming, and pneumatics.

DETAILED DESCRIPTION OF EMBODIMENTS

The present invention will be understood more fully from the detailed description given below and from the accompanying drawings of various embodiments of the invention, which, however, should not be taken to limit the invention to the specific embodiments, but are for explanation and understanding only.

Disclosed embodiments provide reversible mechanical impedance with MR fluid at prescribed magnetic fields. In preferred embodiments, the magnetic field is on the order of 10-35 milli-Tesla (mT). This may be accomplished by patterning the bounding surfaces with an array of microchannels. When a magnetic field is applied, the fluid in the channels form confined magnetic domains that resist separation as the overlapping surfaces slide past each other.

Figure 1:
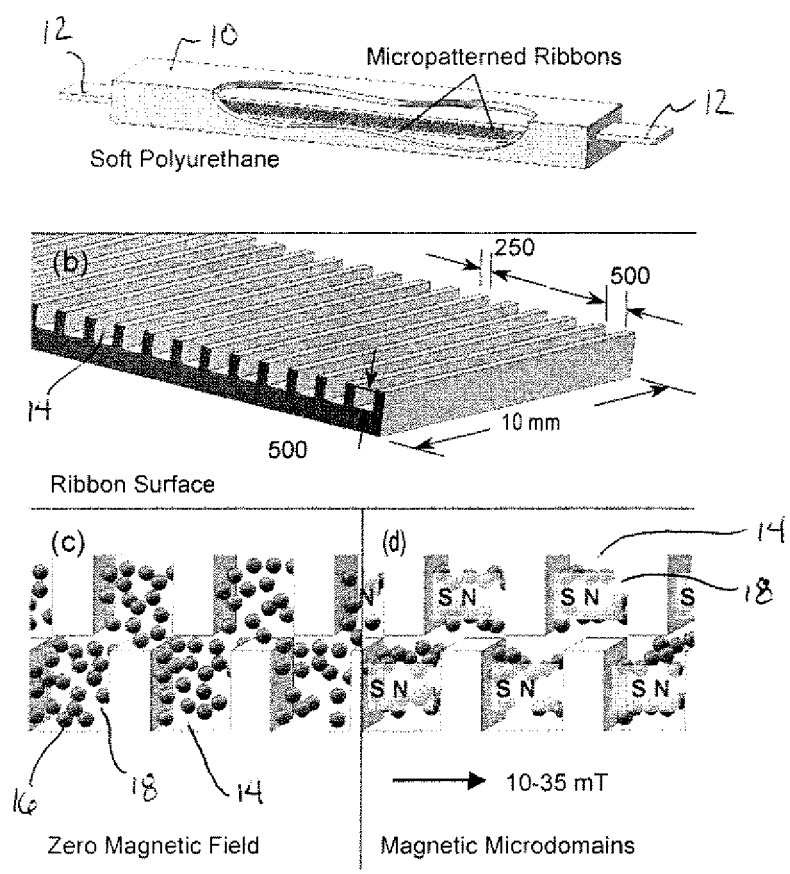
FIG. 1(a) illustrates a perspective view of an exemplary elastomeric sheet embedded with rigid micropatterned ribbons according to an exemplary disclosed embodiment.
FIG. 1(b) illustrates a conceptual view of an exemplary ribbon patterned with an array of aligned microchannels according to an exemplary disclosed embodiment.
FIG. 1(c) illustrates a conceptual view of exemplary randomly dispersed magnetizable MR particles within microchannels according to an exemplary disclosed embodiment.
FIG. 1(d) illustrates a conceptual view of exemplary MR particles forming magnetic domains confined to microchannels according to an exemplary disclosed embodiment.

Turning to FIG. 1(a), an ultrasoft polyurethane elastomer 10 (e.g., Sorbothane®, elastic modulus approximately 1 MPa) is embedded with rigid, micropatterned plastic ribbons 12 that slide past each other. Ultrasoft polyurethane elastomer 10 encloses ribbons 12 via a chamber filled with magnetorheological (MR) fluid. In a preferred embodiment, the microchannels are patterned on the inside surfaces of two overlapping ribbons. Some disclosed embodiments provide approximately 1 cm wide, 1 mm thick plastic ribbons 12 having approximately an elastic modulus of 2 GPa (e.g., Veroblack, Objet Geometries Inc.) and may be molded in a 3D printer (e.g., Connex500™, Objet Geometries Inc.). Within a region of overlap (e.g., 5 cm), the ribbon surfaces may contain channels 14. In one disclosed embodiment, the channels 14 are approximately 500 μm wide, 500 μm deep, and spaced 250 μm apart, as shown, for example, in FIG. 1(b). The ribbons 12 are preferably enclosed in a polyurethane-sealed chamber (Sorbothane®, approximately 0030 Shore Hardness, approximately 1 mm wall thickness) of MR fluid (carrier oil) (MRF-140CG, LORD Corporation, solids content by weight is approximately 85.4%).

As illustrated in FIG. 1(c), the magnetizable microparticles 16 are randomly dispersed in the carrier oil 18. In this configuration, the only resistance to stretching is the intrinsic elastic stiffness of the elastomer 10 and the viscous drag of the fluid inside the ribbon interface. As illustrated in FIG. 1(d), applying a magnetic field along the central axis of the ribbon 12 (and perpendicular to the channel orientation) magnetizes the particles 16 within the MR fluid or carrier oil 18 and causes them to align and form magnetic domains within the channels 14 of the opposing ribbons 12. Stretching the elastomer 10 requires an enhanced friction force to separate the confined domains and slide the ribbons 12 past one another.

Friction may be immediately enhanced when a magnetic field is applied. No interfacial sliding is required to initiate or enhance sliding between the overlapping surfaces. Resistance to interfacial sliding and stretching of the surrounding elastomer is maintained for the duration of time that the external magnetic field is applied. Once the magnetic field is removed, the MR fluid is no longer magnetized and returns to acting as a low viscosity lubricant between the overlapping surfaces.

Any suitable means, associated equipment and materials may be utilized to employ the magnetic field to the MR fluid. Such equipment and materials may be configuratively coupled to the elements of the disclosed device such as, for example, to ribbons 12. In the described arrangement, a magnetic field may be induced, for example, along the central axis of ribbons 12 to magnetize the particles 16 of the MR fluid. In one preferred embodiment, the magnetic field may be generated with a tightly wound helical coil of electrical wire. An electrical current may be passed through the electrical wire to produce approximately 0 to 35 milli-Tesla (mT) of magnetic field along the central axis of the coil. Application of the magnetic field may not be limited to the aforementioned method. For example, the magnetic field may also be accomplished with a planar spiral coil of electric wire or with permanent magnetics or any other suitable implementation of applying magnetic fields to magnetize the MR fluid. In some cases, the magnetic field may also be produced with a solenoid electromagnet, in which an electrical wire is tightly wrapped around a ferromagnetic core such as an iron bar.

Figure 2:
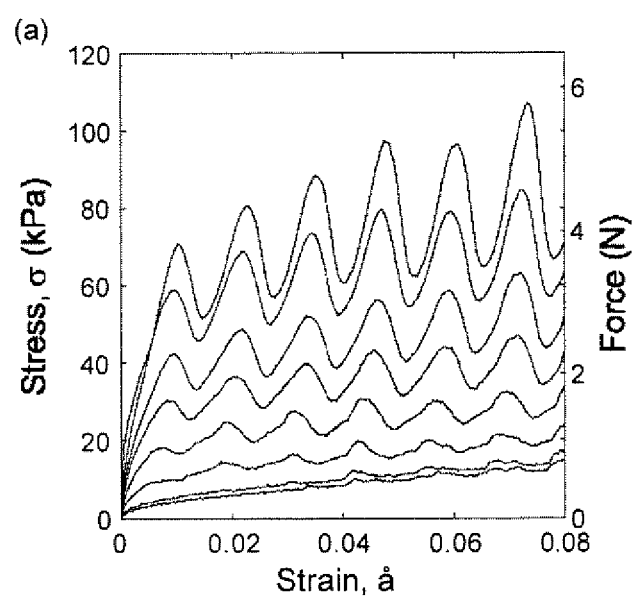
FIG. 2 illustrates a graph plotting tensile strain versus stress for an applied magnetic field according to an exemplary disclosed embodiment.

A plot of strain versus tensile stress is presented in FIG. 2. The curves, from bottom to top, correspond to magnetic fields of 0, 5, 10, 15, 20, 25, 30, and 35 mT. Tensile tests were performed on a single column load cell (5544A Instron) at a speed of 15 mm/min. Past a strain of about one percent, the stress-strain curves exhibit periodic fluctuations with a period of 750 μm, equal to the center-to-center spacing of the surface channels. This is consistent with the postulate of confined magnetic domains, wherein the resistance to elastomer stretching fluctuates as magnetic bonds between the opposing channels are broken and then replaced with new bonds between newly aligned channels.

Figure 3:
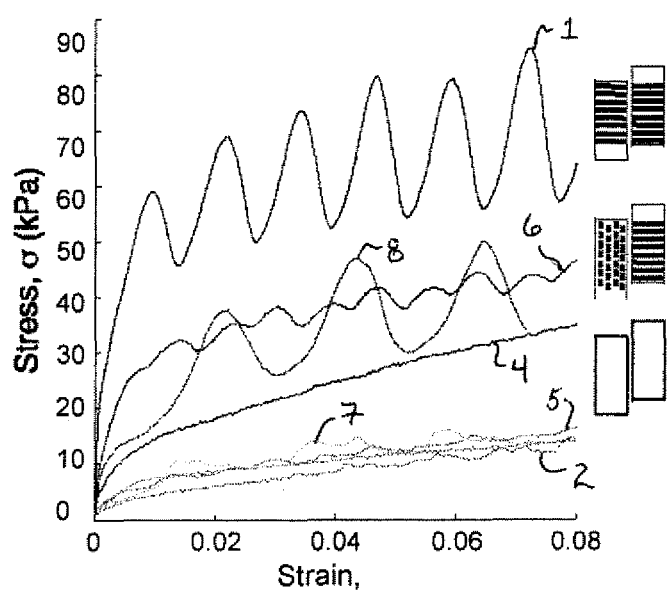
FIG. 3 illustrates stress-strain curves for elastomers embedded with various ribbon surface geometries according to an exemplary disclosed embodiment.

A comparison of strain-stress curves for various ribbon surface geometries are presented in FIG. 3. Curve 1 and curve 2 correspond to 500 μm wide channels under an applied field of 0 and 30 mT, respectively. These same curves also appear in FIG. 2. Curve 3 and curve 4 correspond to smooth, unpatterned ribbons under 0 and 30 mT, respectively. In the absence of a magnetic field, both geometries exhibit similar stress-strain curves. In this regime, the mechanics are largely dominated by the elastic stretching of the polyurethane enclosure. However, under a field of 30 mT, the mechanical resistance of the unpatterned system is less than half of that of the system containing aligned, 500 μm wide channels.

As shown in the inset to FIG. 3, the curve 5 and 6 correspond to a pair of ribbons where one surface contains 750 μm wide channels that are spaced 250 μm apart while the opposing surface contains holes that are 750 μm long, 500 μm wide, and 500 μm deep. The curve under zero magnetic field (curve 5) is the same as for the unpatterned and 500 μm channel specimens. Under a field of 30 mT, the mechanical resistance (curve 6) increases but is still half that of the elastomer containing the aligned 500 μm channels. Also, curve 6 does not exhibit significant periodic fluctuation. Together, these properties suggest that the staggered pattern neutralizes the alignment of magnetic poles across the interface and thus limits the mechanical resistance to stretching.

Lastly, curve 7 and curve 8 in FIG. 3 show the stress-strain relationship for a pair of ribbons that overlap over 2.5 cm. The fluid-filled chamber has a total length 3.5 cm and so one percent strain corresponds to 350 μm of displacement. The ribbons are composed of 500 μm channels spaced 250 μm apart and so, as expected, a fluctuating stress-strain curve with 750 μm period is observed. Moreover, the mechanical resistance appears to be proportional to the length of the ribbon overlap. This is consistent with the magnetic domain model, which suggests that the force required to stretch the embedded elastomer and slide the interface is proportional to the number of interfacial magnetic bonds.

A theoretical estimate for the tensile resistance is derived by calculating the force between individual magnetic domains. For magnetic fields on the order of 10 mT, the MR fluid has a magnetic permeability μ of approximately 20 N/kA$^2$ (technical data for MRF-140CG, LORD Corporation). This corresponds to a relative permittivity of $\mu_r=\mu/\mu_0=16$ and a magnetic susceptibility of $\chi=\mu_r-1=15$, where $\mu_0=1.256$ N/kA$^2$ is the vacuum permittivity. For an applied field of B=30 mT, the fluid has a magnetization of M=χB/μ=22 kA/m.

The magnetized fluid is stored in parallel channels that slide past each other. Let x denote the distance between the centers of the channels in the direction of sliding. The total potential energy between channels is obtained by integrating the interaction energy of each pair across the interface:

$$U = \int_v \frac{\mu M^2}{4\pi r^3} \left\{ \left( \frac{x_2 - x_1 + x}{r} \right)^2 - 1 \right\} dV,$$

where $$r = \sqrt{(x_2 - x_1 + x)^2 + (y_2 - y_1 + D)^2 + (z_2 - z_1)^2}$$

$$\int_v = \int_{-L/2}^{L/2} \int_{-D/2}^{D/2} \int_{-w/2}^{w/2} \int_{-L/2}^{L/2} \int_{-D/2}^{D/2} \int_{-w/2}^{w/2}$$

$$dV = dx_1 \, dy_1 \, dz_1 \, dx_2 \, dy_2 \, dz_2$$

Here, L=1 cm, w=500 μm, and D=500 μm are the length, width, and depth of the channels, respectively. According to the above equation, the sliding resistance F=dU/dx reaches a maximum value of 12.7 mN when the centerlines of the channels are separated by a distance x≈300 μm along the direction of sliding. That is, F is greatest when the channels are roughly staggered such that the opposing magnetic poles are aligned. The surfaces of each overlapping ribbon contains 66 vertically aligned channels, and so the theory predicts that 0.84 N of force is necessary to shear the interface.

This theoretical analysis represents a simplified idealization of the interfacial mechanics. Referring to FIG. 2, the theoretical estimate of F=0.84 N is comparable to the experimentally measured amplitude of the oscillation under a field of 30 mT. However, it is several times smaller than the total difference in experimentally measured resistance between elastomers containing patterned and unpatterned ribbons. In order to obtain a more accurate theoretical estimate, it may be necessary to include fluidic and viscoplastic contributions into the analysis. The theory may also be improved by accounting for the mobility of the MR particles within the channels as well as the variation in magnetic susceptibility as the particles separate from the carrier oil.

In application, a pair of preferably rigid micropatterned ribbons 12, having microchannels 14, are immersed in an elastomer 10 enclosed chamber of MR fluid 18. A magnetic field is applied to induce magnetic domains between the micropatterned ribbons 12 that are confined to the microchannels 14 which line the overlapping surfaces. Thus, additional force is thereby required to slide the ribbons past one another and stretch the elastomer scales corresponding to the number of channels in accordance with the applied intensity of the magnetic field. Experiments performed with various ribbon 12 geometries suggest that the mechanics are governed by friction between channels 14 of confined MR fluid 18. In addition to a refined theoretical analysis, future work will also focus on dynamical loading and hysteresis. Lastly, the principle of confined magnetic domains might be extended to the sub-micron scale with ferrofluids and nanopatterned surfaces.

External magnetic fields may be produced with a helical or planar coil of electric wire. Passing current through the wire produces a magnetic field along the central axis of the coil. The magnetic field may be further enhanced by placing ferromagnetic material inside, around, or near the coil as in a solenoid electromagnet. For all of these electromagnets, the intensity and direction of the magnetic field is controlled by the intensity and direction of the electric current passed through the wire. Lastly, the magnetic field can be produced with a permanent magnet, in which intensity and direction is controlled by changing the orientation and proximity of the magnet relative to the micropatterned interface.

When the magnetic field is applied to overlapping micropatterned surfaces immersed in MR fluid, the MR fluid forms microconfined domains and enhances sliding friction. The increase in mechanical resistance induced by sliding friction is analogous to the increased rigidity of human muscle when calcium ions diffuse into muscular tissue and create chemical bonds between overlapping collagen filaments within each sarcomere. In both systems, enhanced sliding friction between overlapping surfaces or fibrils leads to an increase in stretching rigidity of the surrounding elastomer or tissue. This increase in stretching rigidity vanishes when the enhancement in sliding friction is eliminated.

Figure 4:
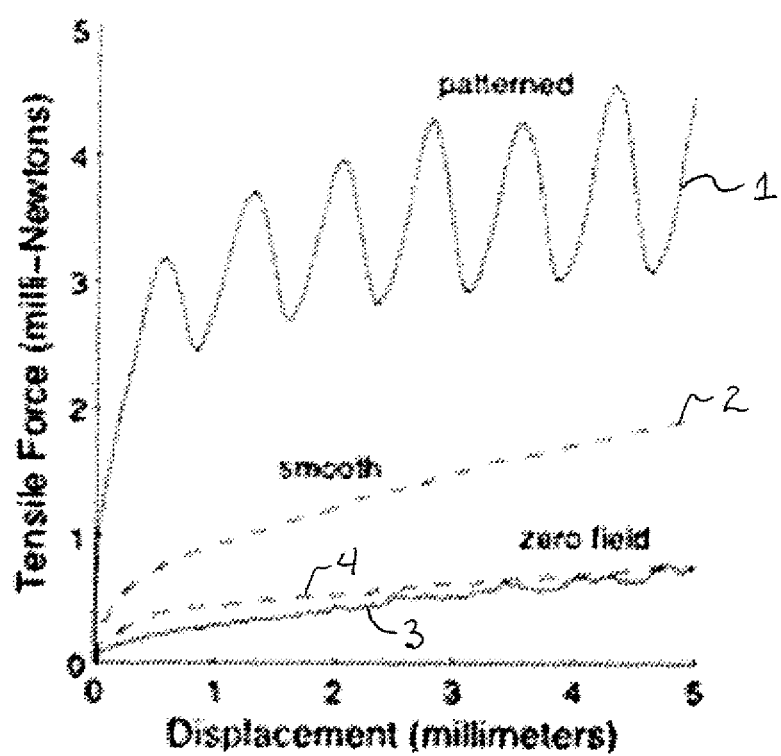
FIG. 4 illustrates a graph plotting tensile force versus displacement for altering elastomer structures according to an exemplary disclosed embodiment.

Enhanced MR-friction at low magnetic field has a potential role in a broad range of existing and next-generation technologies. FIG. 4 illustrates a graph plotting tensile force versus displacement for altering elastomer structures according to an exemplary disclosed embodiment. The differences in tensile force required to stretch an elastomer embedded with overlapping surfaces immersed in MR fluid is readily seen. Curves 1 and 3 represent ribbon surfaces 12 patterned with channels that are 500 microns wide, 500 microns deep, and spaced 250 microns apart. Curve 2 and 4 represent unpatterned ribbon surfaces 12. Curves 1 and 2 are measured for a 30 mT field. Curves 3 and 4 are measured for a 0 mT field.

As shown in FIG. 4, patterning MR-immersed surfaces with microstructures enhances sliding friction by more than a factor two. Alternatively, the micropatterned surfaces exhibit the same sliding friction as smooth surfaces under one-half the magnetic field. Moreover, for an electromagnet, magnetic field scales with the square root of electrical power and so a 50% reduction in required field corresponds to a 75% reduction in electrical power; i.e., Applicant's determine MR applications with micropatterned discs, as disclosed herein, require ¼th the energy to operate.

Apart from reducing the energy costs of existing MR-based technologies, surface micropatterning also allows MR-fluid to be utilized in miniature, soft, and low power systems. These may include tunable rigidity and damping in soft active orthotics, for examples, to correct the gait or stance of patients suffering from brain injury or degraded motor control.

This invention may be incorporated in both rigid and soft active orthoses for controlled resistance to either passive or muscle-activated hand, foot, or limb motion. In the absence of a magnetic field, an elastomer embedded with MR fluid and overlapping micropatterned surfaces will remain soft and stretchable. It will accommodate natural human motions, either passive or muscle-activated, with negligible mechanical interference. When a magnetic field is applied, the embedded elastomer will resist stretching and induce mechanical forces at anchor points where the orthotic is fixed to the skin or clothing or on a collar that is tightly wrapped around a limb, joint, or other extremity.

In addition, MR damping control may not be limited to medical orthoses. For example, disclosed embodiments of MR damping control may also be integrated into athletic apparel or footwear for injury prevention and performance enhancement. Examples may include a helmet or padding that becomes rigid in anticipation of or at the first instance of an impact or an ankle or shoulder brace that becomes rigid to prevent hyperextension. Future applications may include artificial muscles for soft or miniaturized robots and active aerospace structures that adapt their rigidity under rapidly changing environmental and loading conditions. Reversible control of rigidity allows a soft robot or exploratory instrument to squeeze into a confine space with negligible force and to then lock in place to prevent further motion. In marine or aerospace systems, reversible rigidity control allows a surface or structure to tune its hydrodynamic properties by altering the interdependent relationship between fluid flow, surface tractions, and mechanical deformation.

Of course, these are only exemplary applications of embodiments for applying low magnetic fields to MR-fluid systems disclosed herein. One of ordinary skill in the art understands that such low magnetic field and MR-fluid systems may be useful for a broad range of other applications. While the application of applying low magnetic fields to MR-fluid systems is described herein by way of example and embodiments, those skilled in the art will recognize that the system and method of applying low magnetic fields to MR-fluid systems is not limited to the embodiments or drawings described. It should be understood that the drawings and description are not intended to limit embodiments to the particular form disclosed. Rather, the intention is to cover all modifications, equivalents and alternatives falling within the spirit and scope of the invention defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A method for varying stiffness of a system, comprising:
   immersing a pair of micropatterned elements, each of said elements having microchannels formed therein, in an elastomer enclosed chamber of magnetorheological (MR) fluid; and
   applying a magnetic field to induce formation of magnetic domains whereby a stiffness of the MR fluid in the microchannels of the system is changed.

2. The method of claim 1, wherein the elements are aligned with overlapping surfaces of one another such that the applied magnetic field induces magnetic domains that are confined to the microchannels lining the overlapping surfaces.

3. The method of claim 1, wherein the magnetic field is applied to a central axis of said elements.

4. The method of claim 1, wherein the magnetic field is on the order of 10-35 milli-Tesla (mT).

5. The method of claim 1, wherein the elements are plastic ribbons.

6. The method of claim 5, wherein the plastic ribbons are approximately 1 cm wide, 1 mm thick and having an elastic modulus of 2GPa.

7. The method of claim 5, wherein the microchannels are approximately 500 μm wide, 500 μm deep, and spaced 250 μm apart.

8. The method of claim 5, wherein the elastomer comprises ultrasoft polyurethane material.

9. A system for varying stiffness of a device comprising:
   at least a pair of micropatterned elements, said elements having microchannels formed therein;
   an elastomer having an enclosed chamber of magnetorheological (MR) fluid dispersed therein;
   said micropatterned elements being immersed in said elastomer enclosed chamber of MR fluid; and
   means for generating a magnetic field along the axis of said micropatterned elements to magnetize the MR fluid.

10. The system of claim 9, wherein the elements are aligned with overlapping surfaces of one another.

11. The system of claim 9, wherein the elements are plastic ribbons.

12. The system of claim 11, wherein the plastic ribbons are approximately 1 cm wide, 1 mm thick and having an elastic modulus of 2GPa.

13. The system of claim 9, wherein the microchannels are approximately 500 μm wide, 500 μm deep, and spaced 250 μm apart.

14. The system of claim 11, wherein the elastomer comprises ultrasoft polyurethane material.

15. The system of claim 14, wherein the elastomer has an elastic modulus of approximately 1 MPa.

16. The system of claim 11, wherein the ribbons are rigid.

17. The system of claim 11, wherein the enclosed chamber is a polyurethane-sealed chamber.

18. The system of claim 17, wherein the enclosed chamber has an approximate Shore Hardness of 0030.

19. The system of claim 17, wherein the enclosed chamber comprises a wall thickness of approximately 1 mm.

20. The system of claim 11, wherein the MR fluid comprises approximately 85.4% solid content by weight.

21. An orthosis device comprising:
   at least a pair of micropatterned elements, said elements having microchannels formed therein;
   an elastomer having an enclosed chamber of magnetorheological (MR) fluid dispersed therein;
   said micropatterned elements being immersed in said elastomer enclosed chamber of MR fluid; and
   means for generating a magnetic field along the axis of said micropatterned elements to magnetize the MR fluid.

22. The device of claim 21 wherein the orthosis device comprises one of a helmet, padding, ankle brace, shoulder brace and an orthotic support.

* * * * *